United States Patent [19]

Fayfield

[11] 4,356,393
[45] Oct. 26, 1982

[54] ALIGNMENT INDICATOR FOR PHOTOELECTRIC SCANNERS

[75] Inventor: Robert W. Fayfield, Excelsior, Minn.

[73] Assignee: Banner Engineering Corp., Minneapolis, Minn.

[21] Appl. No.: 154,223

[22] Filed: May 29, 1980

[51] Int. Cl.³ ............................................. H01J 40/14
[52] U.S. Cl. ................................. 250/214 R; 250/221
[58] Field of Search ...................... 340/870.29, 870.26; 250/221, 222, 214 R; 356/226, 227, 141, 152

[56] References Cited

U.S. PATENT DOCUMENTS

| | | | |
|---|---|---|---|
| 3,846,028 | 11/1974 | List | 356/218 |
| 3,883,252 | 5/1975 | Ando | 356/218 |
| 3,909,137 | 9/1975 | Kisanuki | 356/223 |
| 3,924,251 | 12/1975 | Crask | 340/870.29 |
| 3,932,746 | 1/1976 | Swanson | 250/221 |
| 3,995,959 | 12/1976 | Shaber | 356/202 |
| 4,013,886 | 3/1977 | Schmid | 250/221 |
| 4,061,431 | 12/1977 | Toyoda | 356/227 |

Primary Examiner—David C. Nelms
Attorney, Agent, or Firm—Merchant, Gould, Smith, Edell, Welter & Schmidt

[57] ABSTRACT

A photoelectric scanner system includes photosensors (10), an amplifier (15), and a demodulator (17), and functions to produce an output signal indicative of when light signals of a predetermined intensity are being received by the photosensors. An alignment indicator control circuit (20) is connected to receive the amplified light intensity signals, and functions to produce a repetitive alignment indicating signal whose frequency is generally proportional to the intensity of the received light signal. The signals are applied to an alignment indicator which, in the preferred embodiment, is a light emitting diode, so that the LED flashes at a frequency indicative of the degree of alignment of the system, enabling an operator to accurately align the photoelectric scanning system with reference to the flash rate of the alignment indicator.

15 Claims, 5 Drawing Figures

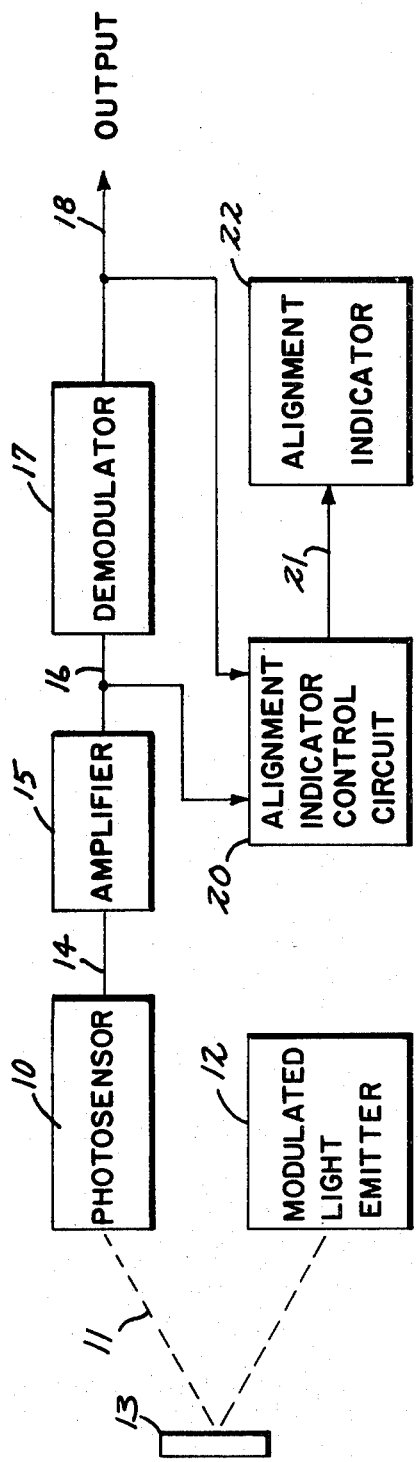
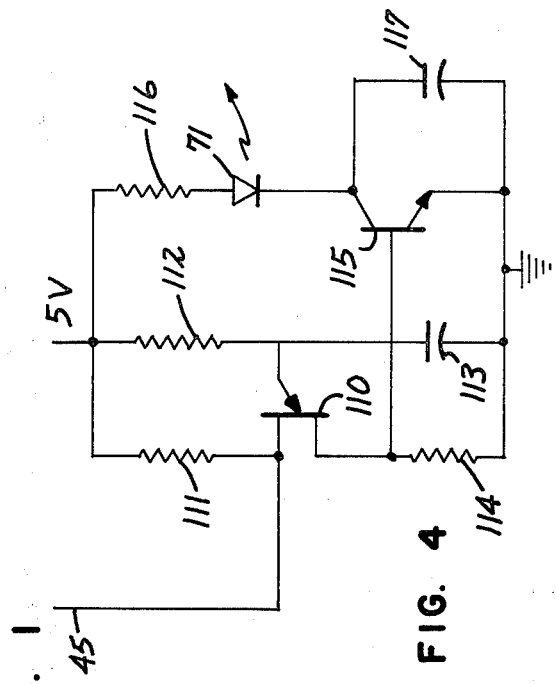
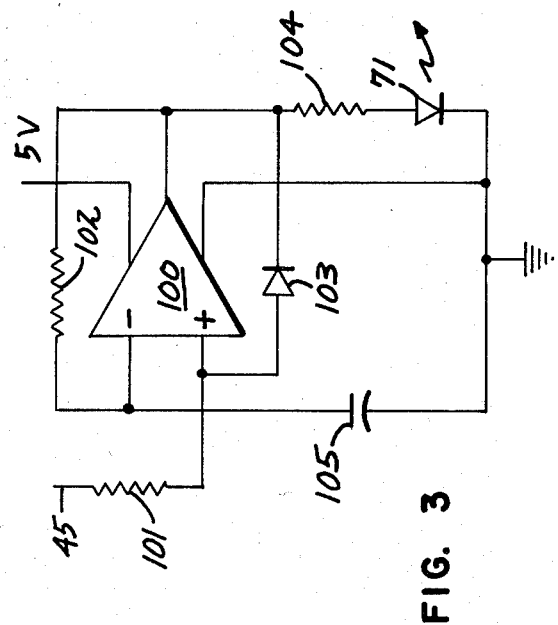
FIG. 1
FIG. 4
FIG. 3

ALIGNMENT INDICATOR FOR PHOTOELECTRIC SCANNERS

TECHNICAL FIELD OF THE INVENTION

This invention relates generally to the field of photoelectric scanners, and specifically to alignment indicating devices for determining and indicating the alignment of a photoelectric receiver with a light beam.

BACKGROUND OF THE PRIOR ART

Photoelectric scanners are widely used in industry for a variety of measurement and control functions, based upon the breaking or restoring of a light beam emitted and received by the scanner system. Examples include the counting of objects moving along a conveyor, detection of the movement of a machine part to a predetermined position, and countless other applications in many different industries. Photoelectric scanners can be of two general types. In one type, a single housing contains both the light emitter and the receiver, and a reflecting target is used to rebound the beam from the emitter back to the receiver across the path of objects of be detected. The other type uses an emitter and a receiver in separate housings which are placed on opposite sides of the path of the objects to be detected, with the beam being transmitted directly from the emitter across the path to the receiver.

In all types of photoelectric scanning systems some method of indicating proper alignment of the optical path is required to aid in the correct positioning of the elements or reflector for proper operation of the system. Many recent photoelectric scanners utilize an indicating lamp or light emitting diode to indicate system alignment. Circuitry is provided for lighting the lamp or LED when the scanning beam from the emitter is aligned with the receiver, and to turn off the lamp or LED when the beam is broken or misaligned with the receiver. When installing a system, the emitter, receiver and reflecting target, if any, are positioned to cause the indicating lamp or LED to turn on, and the elements can then be secured in that position. While this type of prior art alignment indicator is useful in achieving alignment in most cases, it is unfortunately subject to certain disadvantages and difficulties. The most common difficulty is that a system aligned with this type of prior art indicating device may still be subject to faulty operation in subsequent use. The problem arises from the fact that the prior art alignment indicators do not indicate the degree of alignment of the beam with the receiver, but instead only indicate the the alignment is adequate to permit detection of the beam under the conditions prevailing at the time of the aligning process. Unfortunately, it is common to have a situation where the alignment is only marginal at the time of the installation, so that a small amount of vibration, dirt buildup or drift of the amplifier electronics will cause faulty operation in subsequent use of the system.

The present invention overcomes these difficulties by providing alignment indicating means operative to indicate the degree of alignment of the receiver to the beam, so that optimal alignment can be achieved and so that situations of only marginal alignment can be avoided.

SUMMARY OF THE INVENTION

According to the present invention there is provided an alignment measurement and indicating circuit for a photoelectric measuring apparatus, comprising light responsive means for receiving light and for producing an intensity signal indicative of the received light, control means connected to receive the intensity signal and operative in response thereto to produce an output having a frequency that varies with the intensity of the received light. An indicator is provided, which may be visual or audible, and is connected to receive the output of the control means and to produce an indication of the intensity of the received light in terms of the repetition rate of the indicator, so that an operator can accurately align the photoelectric system.

BRIEF DESCRIPTION OF THE DRAWINGS

In the drawing, FIG. 1 is a block diagram of a photoelectric scanner incorporating the present invention;

FIGS. 3, 4 and 5 are schematic diagrams of alternate embodiments of the alignment indicator control circuit according to the invention for use in a scanner system of FIGS. 1 and 2.

DETAILED DESCRIPTION OF THE INVENTION

Figure 2:
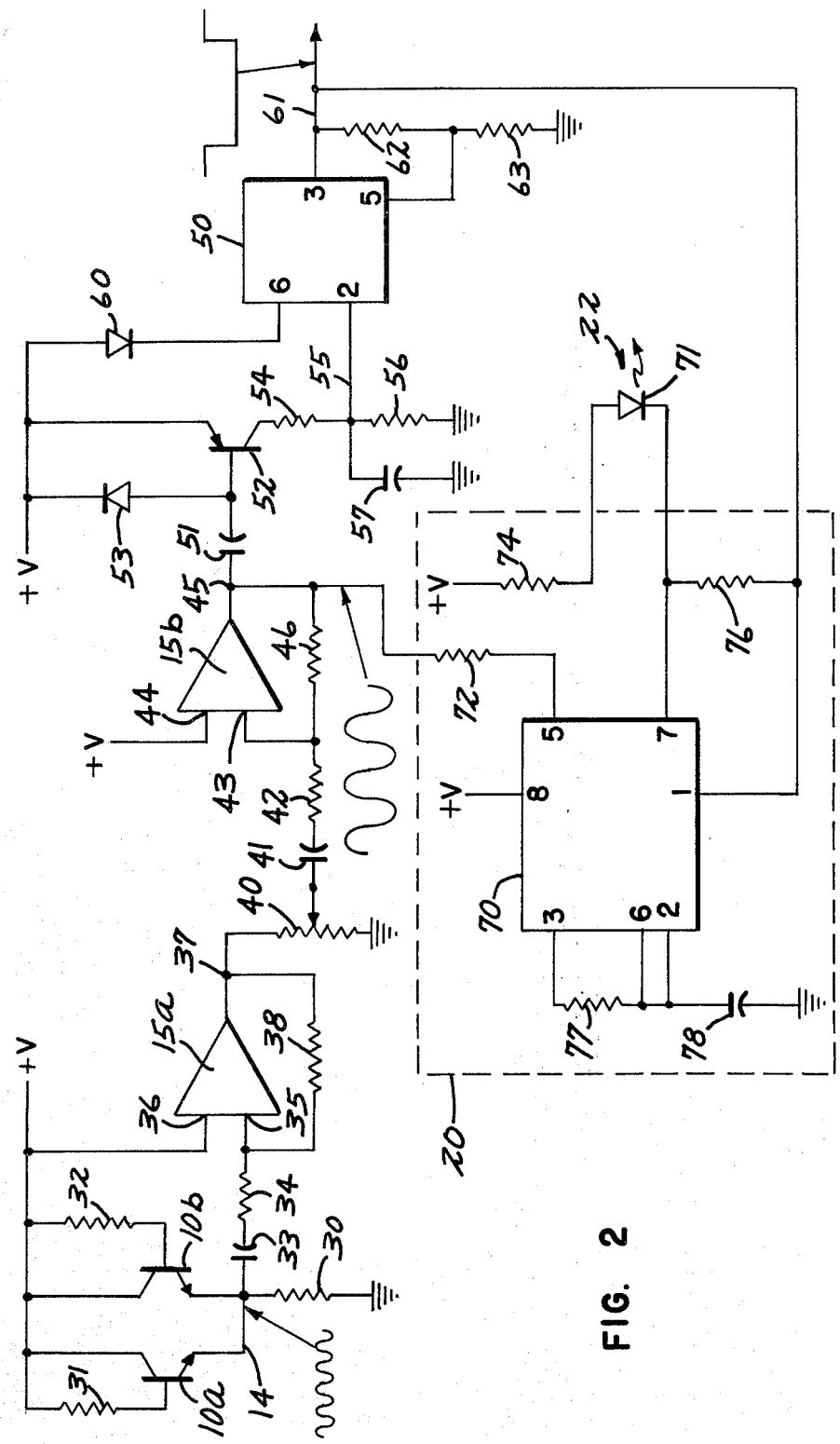
FIG. 2 is a schematic electrical diagram of the receiving portions of the system of FIG. 1, including an alignment indicator control circuit according to the present invention.

In FIG. 1, a photosensor 10 is provided for receiving a light beam which is indicated by broken line 11. The light emanates from modulated light emitter 12, and in FIG. 1 is shown reflecting off a target 13. Emitter 12, reflecting target 13, and photosensor 10 are arranged so that the objects to be detected or counted pass through light beam 11. Photosensor 10 and light emitter 12 may be mounted in a common housing, or alternatively they may be in separate housings, in which case reflecting target 13 would not be required, as emitter 12 and photosensor could be aligned with each other on opposite sides of the path of the articles. In any case, it is necessary to align the optical path by positioning of reflecting target 13, or emitter 12 or photosensor 10.

Photosensor 10 provides an electrical output over lead 14 to an amplifying circuit 15. Amplifier 15 provides an output on lead 16 which is fed to a demodulator circuit 17, and also to the alignment indicator control circuit 20 according to the present invention. Control circuit 20 controls alignment indicator 22 via control line 21 to indicate not only sufficient alignment for operation of the system, but the degree of alignment of the optical path. The output of demodulator 17 is provided at lead 18, in terms of a switch function to be used by the external control or counting device with which the scanner is to be operated. A branch of output 18 connects to alignment indicator control circuit 20 as one of its inputs.

Referring now to FIG. 2, the circuitry of the preferred embodiment of the system of FIG. 1 is shown in greater detail. In FIG. 2, modulated light emitter 12 is not shown as it may be of various circuit designs as is generally known in the art. In the embodiment of FIG. 2, the photosensor 10 comprises a pair of phototransistors 10a and 10b, having their collectors connected to a source of operating potential indicated by the symbol +V. The emitters of phototransistors 10a and 10b are connected together at lead 14, and resistor 30 connects from lead 14 to signal ground. Bias resistors 31 and 32 connect respectively from +V to the bases of phototransistors 10a and 10b.

Lead 14 connects through capacitor 33 and resistor 34 to input 35 of operational amplifier 15a. The other input 36 is connected to +V. The output of operational amplifier 15a connects to lead 37, and a feedback resistor 38 connects from the output to input 35. In the embodiment shown, a two stage amplifier is used, with the second stage comprising operational amplifier 15b. The amplified output at lead 37 is fed through potentiometer 40, which is used for gain adjustment, through capacitor 41 and resistor 42 to input 43 of operational amplifier 15b. The other input 44 is connected to +V. The output of amplifier 15b is connected to lead 45, a branch of which connects through feedback resistor 46 to input 43.

The demodulator circuit is of standard design as generally known in the photoelectric scanner industry, and includes a type 555 integrated circuit timer 50 used as a Schmitt trigger. The signal from lead 45 connects through capacitor 51 to the base of a transistor 52, and to the anode of a diode 53, the cathode of which connects to +V. The emitter of transistor 52 connects to +V, and the collector connects through resistor 54 to lead 55. Resistor 56 and capacitor 57 connect from lead 55 to signal ground. Lead 55 connects to terminal 2 of integrated circuit Schmitt trigger 50. A diode 60 connects from +V to terminal 6 of circuit 50. Terminal 3 of circuit 50 is the output of the demodulator, and is connected to lead 61. Resistor 62 connects from lead 61 to terminal 5 of circuit 50, and resistor 63 connects from terminal 5 to signal ground.

The alignment indicator control circuit 20 is indicated by broken line in FIG. 2. In the preferred embodiment, it includes timer 70 and associated components. Timer 70 is an integrated circuit type 555 timer which is used to control the flashing of the alignment indicator 22, which in the preferred embodiment is a light emitting diode 71. A branch of lead 45 connects through resistor 72 to terminal 5 of circuit 70. Terminal 7 connects the cathode of light emitting diode 71. The anode of LED 71 connects through resistor 74 to +V. Resistor 76 connects from the cathode of LED 71 to a branch of lead 61, a branch of which connects to terminal 1. Terminal 8 of circuit 70 connects to +V. Resistor 77 is connected from terminal 3 to the commonly connected terminals 2 and 6. Capacitor 78 connects from terminals 2 and 6 to signal ground.

In the operation of the embodiment of FIG. 2, phototransistors 10a and 10b receive the low level high frequency light pulses emitted from the modulated light emitter 12 of FIG. 1. This signal is received as a low amplitude signal at lead 14 as suggested by waveform 80. This waveform is amplified by amplifier 15a and 15b and appears as a higher amplitude signal at lead 45 at the output of amplifier 15b. This signal is indicated by waveform 81, and comprises a modulated signal which swings above and below the +V reference voltage (amplifiers 15a and 15b being supplied with operating bias potentials somewhat higher than the reference voltage +V).

The amplified light intensity signal 81 from amplifier 15b is applied to the demodulation circuit which includes transistor 52 and Schmitt trigger 50 and associated components. It should be noted that demodulation circuits are well known in the art and any of the various types of these circuits would work as the demodulator. As previously mentioned, the preferred embodiment uses an integrated circuit type 555 timer connected as the Schmitt trigger. Diode 53 provides a discharge path for capacitor 51, and diode 60 is necessary when using a 555 integrated circuit timer as a Schmitt trigger, as it assures that pin 6 of the 555 timer is slightly below the Vcc supply voltage, which allows some internal circuitry to conduct in the 555 timer. When the output of the amplifier, coupled through capacitor 51, exceeds about 6/10ths volt peak (1.2 volt peak to peak), transistor 52 begins to conduct and amplify at its maximum open-loop gain. This provides a squared, saturated signal at the collector of transistor 54. Resistors 54 and 56 and capacitor 57 are chosen to provide a time constant consistent with the frequency of the emitted light, such that if pulses are close enough together (high enough frequency) capacitor 57 will continue with each pulse to charge to a higher voltage than that to which it will discharge through resistor 56 during the time between pulses. After enough pulses have arrived (typically about 20 pulses) capacitor 57 charges to the threshold of the 555 timer which is about two thirds of Vcc, and the 555 output conducts. Conversely, when enough time has passed without pulses, capacitor 65 discharges to a lower threshold (due to the internal hysteresis of the 555 timer) and the output at lead 61 reverts to its non-conducting or off state. Resistors 62 and 63 add to the hysteresis that is inherent in the 555 timer.

The result of this operation is to produce an output signal at terminal 3 of circuit 50 indicating when light pulses of sufficient amplitude are being received by phototransistors 10a and 10b. The signal level at lead 61 is a logical high (5 volts DC) when no light pulses are being received and is a logical low signal (approximately 0.5 volts DC) when light pulses of sufficient amplitude are being received. This output is indicated by waveform 82.

It will also be appreciated that other types of demodulators can be used, including those which rectify and filter the pulses to produce a DC voltage level which is passed to a Schmitt trigger to operate the output.

Circuit 70, which is another type 555 integrated circuit timer, and associated components, provide a flashing alignment indicating signal for LED 71, as follows. Pin 5 of the 555 timer, circuit 70, is a reference voltage to which the timing capacitor 78 must charge for each oscillation, and is normally fixed internally at two thirds of the supply voltage, approximately one time constant. However, pin 5 is connected through resistor 72 to lead 45 from the output of amplifier 15b. This causes the reference voltage for pin 5 to be modulated by a signal appearing at the output of amplifier 15b. With no light pulses striking phototransistors 10a and 10b, lead 45 will be at a steady 5 volts DC (assuming a +V reference of 5 volts), and circuit 70 will tend to oscillate at a rate determined by capacitor 78 and resistor 77. As light pulses are receoved by phototransistors 10a and 10b, the signal at lead 45 swings above and below +5 volts DC by an amount proportional to the magnitude of the light pulses. The amount that the signal at lead 45 swings below 5 volts DC reduces the voltage to which capacitor 78 must charge for each oscillation, thereby reducing the period and increasing the oscillation rate. By suitable selection of capacitor 78, resistor 77 and resistor 72, it is possible to create a nearly linear relationship between the amplitude of the incoming light pulses and the flash rate of LED 71.

The ground for circuit 70 is provided via the output of Schmitt trigger circuit 50, via lead 61 to terminal 1. This results in no oscillating or lighting of LED 71 until sufficient signal is received to energize the demodulator and provide an output at lead 61. By connecting capacitor 78 to ground separately, it is assured that the oscillation of circuit 70 will begin in a state that causes LED 71 to be lighted, thereby avoiding a situation where alignment may be correct, but the indicator LED 71 does not light for a full second or more.

Resistor 76 bypasses the oscillator circuit 70 and permits a small current to flow through LED 71 all the time that the output of the demodulator, at lead 61, is at a logical low level. This causes the indicator to light when the receiver is energized, and also the LED will be modulated in brightness at a pulse rate proportional to the signal strength being received, due to the oscillation of circuit 10.

Thus, the system may be aligned by first noting when LED 71 lights, indicating that sufficient signal strength has been received to provide an output at lead 61. The modulated flashing rate of LED 71 is then observed while the system is further aligned to maximize the flashing repetition rate. Since the flashing repetition rate is proportional to signal strength, optimum alignment can be achieved. Note that the output flash rate is very slow compared with the pulse rate of the emitted light, so that it can be visually followed.

The principle is not limited to a visual indication, but an audible output device could also be provided, either separately or in conjunction with the visual indicator. This would produce clicks sounding somewhat like a geiger counter, with increasing repetition rate of the clicks indicating strong signals.

An alternate embodiment of the alignment indicator control circuit 20 is shown in FIG. 3. In that embodiment, lead 45, from the output of the amplifiers, connects through resistor 101 to the non-inverting input of operational amplifier 100. Feedback resistor 102 connects from its output back to its inverting input. The non-inverting input also connects through diode 103 to the output, and the output of amplifier 100 connects through resistor 104 to the anode of indicating LED 71. The cathode of LED 71 connects to signal ground, and a capacitor 105 connects from the inverting input to signal ground.

In the operation of FIG. 3, the flash rate is determined by the values of resistor 102 and capacitor 105 and the magnitude of the negative going peak of the amplified intensity signal from lead 45. As the magnitude of the negative going peak of the light intensity signal increases, the voltage to which capacitor 105 must charge for each oscillation is decreased. Therefore, as the magnitude of the received light increases, a corresponding increase in the flash rate of alignment indicator LED 71 will occur.

In the embodiment of FIG. 4, lead 45 from the amplifier output connects to the upper base of a unijunction transistor 110, and also through a resistor 111 to the power supply lead. Resistor 112 also connects from the power supply to the emitter of the unijunction transistor 110, and capacitor 113 connects from the emitter electrode of the unijunction transistor to signal ground. The lower base of transistor 110 connects to the base of transistor 115, and also through resistor 114 to signal ground. The emitter of transistor 115 connects to signal ground, and the collector connects to the cathode of LED indicator 71. The anode of LED 71 connects through resistor 116 to the power supply lead, and capacitor 117 connects from the collector of transistor 115 to signal ground.

The flash rate of the circuit in FIG. 3 is determined by the values of resistor 112 and capacitor 113 and the magnitude of the nagative going peaks of the amplified intensity signals from lead 45. As the magnitude of the negative going peaks of the signal at lead 45 increases the voltage to which capacitor 113 must charge in order to trigger unijunction transistor 110 is lowered, causing a corresponding increase in the flash repetition rate. Transistor 115 and capacitor 117 are provided as a pulse stretcher, since the pulses from unijunction transistor 110 are typically only a few microseconds long and would not produce a visible flash in the LED indicator.

Figure 5:
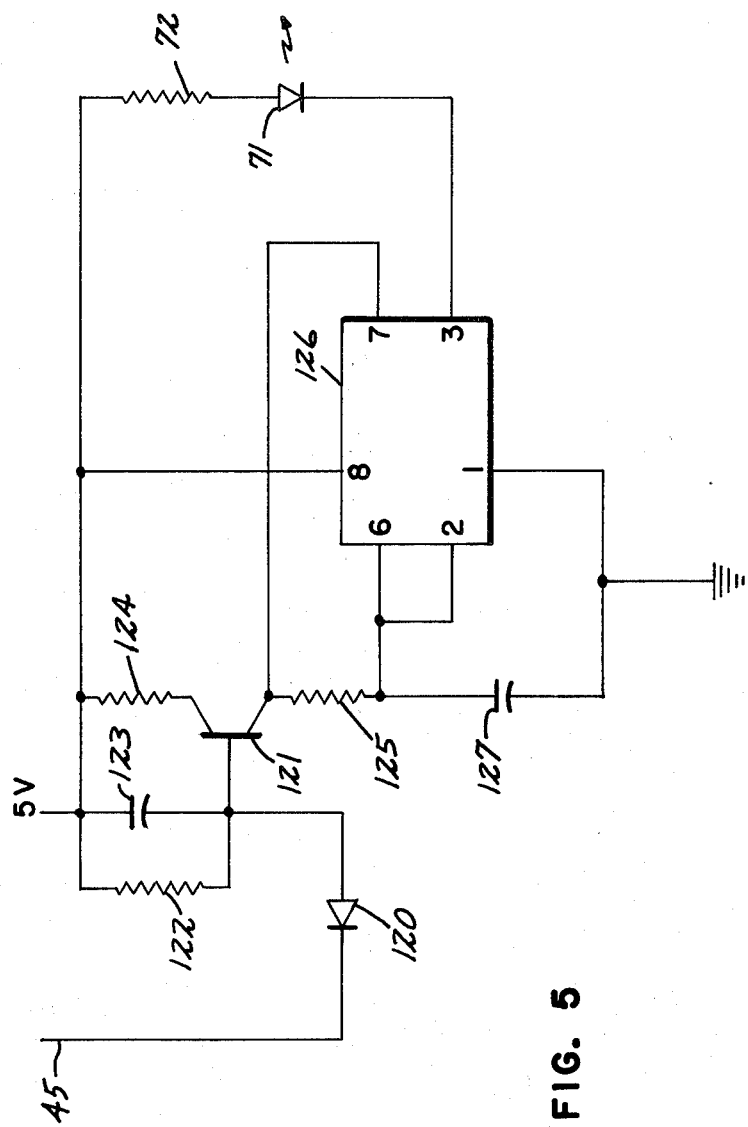

In the embodiment of FIG. 5, lead 45 from the amplifier output connects to the cathode of a diode 120, the anode of which is connected to the base of a transistor 121. Resistor 122 and capacitor 123 are connected in parallel from the base of transistor 121 to the power supply lead. The emitter of transistor 121 connects through resistor 124 to the power supply lead. The collector of transistor 121 is connected through resistor 125 to terminals 6 and 2 of a type 555 integrated circuit timing circuit 126. Terminals 6 and 2 also connect through capacitor 127 to signal ground. Terminal 8 of circuit 126 is connected to the power supply lead and terminal 7 is connected to the collector of transistor 121. The cathode of alignment indicating LED 71 is connected to terminal 3 of circuit 126, and the anode of LED 71 connects through resistor 72 to the power supply lead. Terminal 1 of circuit 126 is connected to signal ground.

In the operation of the embodiment of FIG. 5, the amplified intensity signal from lead 45 is filtered and converted to an analog DC level by diode 120, resistor 122 and capacitor 123. The voltage at the base of transistor 121 is proportional to the amplitude of the amplified intensity signal. Transistor 121 and resistor 124 together form a constant current source which charges capacitor 127. As the amplitude of the amplified intensity signal increases, the voltage to which capacitor 127 must charge for each oscillation decreases. Therefore, the greater the intensity of the light pulses received by the phototransistors 10a and 10b, the higher the flash repetition rate of alignment indicating LED 71.

Each of the embodiments above described provide an alignment indicator whose repetition rate increases in proportion to the intensity of the received signal, thus permitting an operator to accurately align the scanner system by observing the alignment indicator. In the preferred embodiment the alignment indicator is a flashing LED, but other types of indicators including audible indicators can also be used.

What is claimed is:

1. Photoelectric measuring and indicating apparatus, comprising:
    light responsive means for receiving light and producing an intensity signal indicative of the intensity of the received light;
    control means connected to receive said intensity signal and operative in response thereto to produce an output having a frequency that varies with the intensity of the received light; and
    an indicator connected to receive said output and operative in response thereto to produce a repetitive indication synchronous with said output frequency whereby the intensity of the received light may be discerned.

2. Photoelectric measuring and indicating apparatus as defined in claim 1 wherein said light responsive means comprises at least one phototransistor in series with an amplifier circuit which operates to increase the magnitude of said intensity signal produced by said phototransistors to an operable level.

3. Photoelectric measuring and indicating apparatus as defined in claim 1 wherein said indicator comprises a light emitting diode (LED) which flashes in response to said output at a rate indicative of the intensity of the received light.

4. Photoelectric measuring and indicating apparatus as defined in claim 1 wherein said indicator is an alarm which produces audible pulses, the frequency of which is indicative of the intensity of the received light.

5. Photoelectric measuring and indicating apparatus as defined in claim 1 wherein said control means comprises a timing circuit operable in response to the voltage of said intensity signal to produce said output having a frequency that varies with the magnitude of the voltage of said intensity signal.

6. Photoelectric measuring and indicating apparatus as defined in claim 1 wherein said control means comprises a peak detector and a voltage controlled oscillator such that said peak detector is operative in response to said intensity signal to produce a DC voltage which is converted by said voltage controlled oscillator into said output having a frequency that varies with the magnitude of the voltage of said intensity signal.

7. Alignment indicating apparatus for photoelectric scanners comprising:
light responsive means for receiving low level high frequency light pulses and producing an intensity signal indicative of the intensity of the received light pulses;
amplifying means for increasing to an operable level the magnitude of said intensity signal;
control means for receiving said amplified intensity signal and operative in response thereto to produce an output having a frequency that varies with the intensity of the received light; and
indicating means connected to receive said output pulses and operative to flash in response thereto, whereby the intensity of the received light, and thus the alignment of the scanner, is indicated by the flash repetition rate of the indicator light.

8. Alignment indicating apparatus for photoelectric scanners as defined in claim 7 wherein said light responsive means comprises at least one phototransistor operative to produce a modulated intensity signal, the amplitude of which is indicative of the intensity of said light pulses received.

9. Alignment indicating apparatus for photoelectric scanners as defined in claim 7 wherein said indicating means comprises a light emitting diode (LED).

10. Alignment indicating apparatus for photoelectric scanners as defined in claim 7 wherein said signal control means comprises a timing circuit operable in response to the voltage of said amplified intensity signal to produce said output having a frequency that varies with the magnitude of the voltage of said intensity signal.

11. Alignment indicating apparatus for photoelectric scanners as defined in claim 7 wherein said signal control means comprises a peak detector and a voltage controlled oscillator such that said peak detector is operative in response to said amplified intensity signal to produce a DC voltage which is converted by said voltage controlled oscillator into said output pulses having a frequency that varies with the magnitude of the voltage of said amplified intensity signal.

12. Alignment indicating apparatus for photoelectric scanners as defined in claim 10 wherein said timing circuit comprises an integrated circuit timing device, a resistor of known value, and a capacitor of known value, connected to respond to said amplified intensity signal to produce said output by measuring the time it takes said capacitor to charge to a voltage equal to a supply voltage modulated by said amplified intensity signal.

13. Alignment indicating apparatus for photoelectric scanners as defined in claim 10 further comprising a demodulation circuit electrically connected to receive said amplified intensity signal and operative to transform said amplified intensity signal into a logic level output which is near ground potential when said light pulses are being received by said light responsive means and which is equal to some operable positive voltage when said light pulses are not being received.

14. Alignment indicating apparatus for photoelectric scanners as defined in claim 13 wherein the grounding terminal of said integrated circuit timing device is connected to receive said logic level output causing said integrated timing device to be operable only when said light pulses are being received by said light responsive means.

15. Alignment indicating apparatus for photoelectric scanners as defined in claim 13 wherein said indicating means is connected to receive said logic level output through a resistor of known value which causes said indicating means to receive partial excitation when said light pulses are being received by said light responsive means, whereby said indicating means will indicate the fact that light pulses are being received when there is partial excitation and will indicate the intensity of said light pulses by the frequency of the flashes.

* * * * *